Nov. 2, 1948.  W. RUDOY  2,452,685
HUMIDITY CONTROL APPARATUS
Filed June 4, 1945  2 Sheets-Sheet 1

INVENTOR.
WILLIAM RUDOY
BY HIS AGENT

INVENTOR.
WILLIAM RUDOY
BY HIS AGENT

Patented Nov. 2, 1948

2,452,685

UNITED STATES PATENT OFFICE 2,452,685

HUMIDITY CONTROL APPARATUS

William Rudoy, Philadelphia, Pa., assignor, by mesne assignments, to Philco Corporation, Philadelphia, Pa., a corporation of Pennsylvania Application June 4, 1945, Serial No. 597,546

9 Claims. (Cl. 62—6)

This invention has to do with humidity control.

More particularly, the present invention, while of wider applicability, is especially concerned with novel apparatus for controlling the humidity or moisture content of air within the food storage compartment of a refrigerator.

With reference to the application of my invention to refrigerators, it should be borne in mind that it has proven highly desirable to provide a so-called moist-cold compartment maintained at a relative humidity value sufficiently high to properly preserve exposed foodstuffs without dehydration. Such a relative humidity value may, for example, be in the region of 80%. However, in refrigerators embodying such high humidity compartment, it is difficult to insure the desired degree of compartment humidity, while still preventing the humidity from reaching undesirably high values at certain times.

As set forth in the copending application of Malcolm G. Shoemaker, Serial No. 528.581, filed March 29, 1944, now Patent No. 2,416,354, granted Feb. 25, 1947, and assigned to the assignee of the instant invention, excessive humidity results in undesirable condensation of moisture upon the walls of the compartment. The reason for this will be apparent when it is understood that such moist compartments are commonly cooled through the walls thereof and, as a consequence, such walls frequently assume temperature values below the dew-point temperature of the compartment air, when the relative humidity in the compartment has reached the undesirably high values mentioned above.

In the structure illustrated in the above-mentioned copending application, humidity responsive means is provided which removes undesired moisture from the compartment air, as and when required, by passing the air in heat exchange relation with an evaporator maintained at relatively low temperature, which evaporator is also utilized for the production of ice cubes, as well as for low-temperature storage purposes. While the construction of the above-mentioned application is highly advantageous, in that it provides the desired control of the moisture content of the compartment air, the moisture condensed from the air being circulated past the evaporator may, under certain conditions, tend to "frost-out" and accumulate in the dehumidifying zone or passage, thereby restricting the passage area and reducing the heat exchange necessary to effect the desired condensation.

The present invention is concerned with this problem, and has, as a primary object, the provision of a refrigerator having a condensing zone or passage of such a nature that it may be placed in heat exchange relation with a relatively low-temperature evaporator without the possibility of any undesirable accumulation of frost occurring in said passage.

More particularly, it is an object of the present invention to provide dehumidifying apparatus incorporating a condensing zone or passage which, upon the entry of warm, moist air, will rise quickly to a temperature substantially equal to the freezing point of water and remain at such temperature for a length of time sufficient to provide the heat exchange capacity necessary for the adequate removal of excessive moisture from the circulating air.

To the foregoing general ends, the system of my invention includes condensing surfaces of a novel type, which present a relatively low thermal mass at temperatures below the freezing point of water, and provide a very substantial thermal mass at a temperature in the region of 32° F. As the description proceeds, it will be evident that such a structure eliminates any possibility of ice accumulation interfering with the proper functioning of the moisture removal apparatus.

The invention extends further to certain novel constructional features and arrangements hereinafter described and illustrated in the attached drawings, in which.

For the purpose of illustration, the invention is shown and described as applied to a refrigerator of the general character disclosed and claimed in the afore-mentioned Shoemaker application. However, it is to be understood that the present invention is not only applicable to other refrigerating and air-conditioning devices, but in the broader aspect, has utility in the field of hygrometry.

Figure 1:
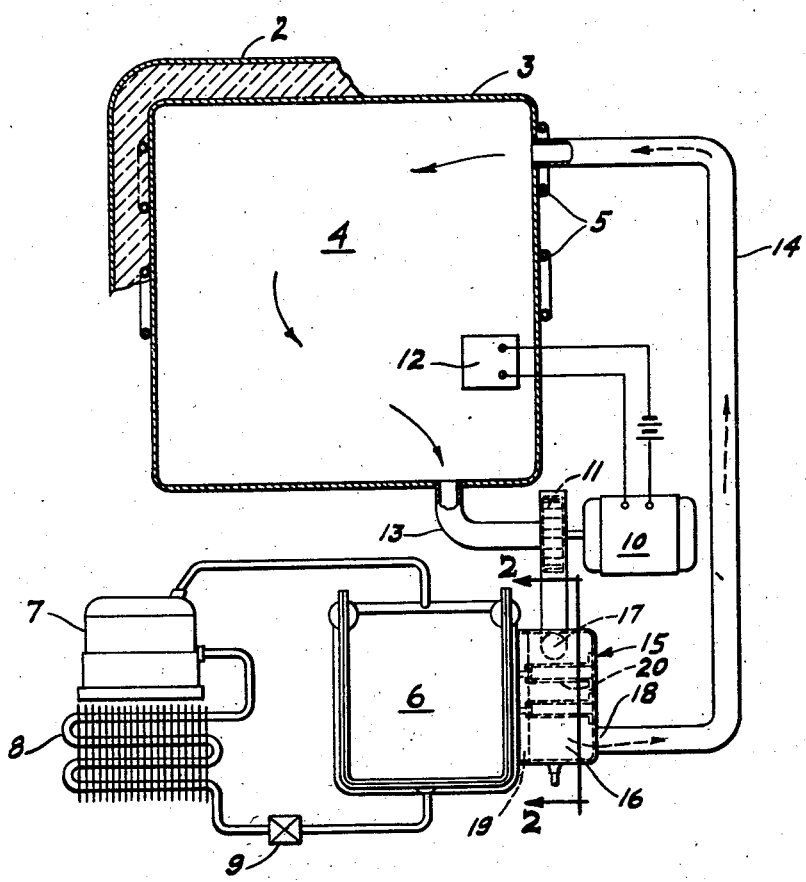
Figure 1 is a somewhat diagrammatic representation of a refrigerator embodying the present invention.

First making detailed reference to Figure 1, there is diagrammatically shown a refrigerator which includes an outer shell, fragmentarily illustrated at 2, and an inner shell or liner member 3, defining a so-called moist-cold food storage compartment 4. This compartment may be fitted with a plurality of shelves of any desired type and would in practice, of course, be provided with a door.

Although any convenient form of refrigerant circuits may be employed, there is illustrated an arrangement in which the main compartment 4 is cooled by means of refrigerant tubing 5 secured in convoluted arrangement about the exterior surface of the inner liner and preferably constituting the evaporator portion of a secondary refrigerant circuit of known type. While detailed description of the refrigerant circuits is not necessary herein, since the present invention is not concerned with such circuits, per se, it may be mentioned that condensation of the secondary liquid in the tubing 5 is, in accordance with usual practice, preferably effected by means of heat exchange association between a condensing portion of said tubing and a portion of a lower temperature primary evaporator, shown at 6. Refrigerant is circulated through the lower temperature evaporator 6 by means of a typical compression-expansion flow system, of which the compressor, condenser and flow restrictor are shown in the drawings at 7, 8 and 9, respectively.

It should be borne in mind that, in common with the above identified Shoemaker disclosure, the invention is concerned with an arrangement in which undesired humidity in the main food storage compartment is eliminated by effecting periodic circulation of the compartment air through certain ducts associated with said compartment, and thence through a passage or zone arranged in heat exchange relation with the lower temperature evaporator 6. In such a system, there is a transfer of latent heat from the moisture-laden air to the cold surfaces associated with the evaporator 6 and, consequently, some of the moisture is condensed from the air and deposited upon these surfaces in the dehumidifying zone. Following this, the air, whose absolute humidity has now been substantially decreased is reinjected into the food storage compartment and, combining with the air in said compartment, acts to lower the overall relative humidity therein.

In the illustrated embodiment of the present invention, this air circulation is effected, as and when required, by means of a motor 10 and associated blower 11, operable periodically in response to deviations from a predetermined condition of percent relative humidity within the compartment 4. This circulation may conveniently be initiated by means of a humidostat 12, which may be of any desired known type. It will be evident that while humidostat control is preferable, it is possible to effect periodic actuation of the air circulation blower by other means.

The air-flow passages have been illustrated in simple form and, as shown, comprise an air withdrawal duct 13, leading to the blower 11, and a return duct 14 through which the air is returned to the compartment 4, after the required degree of dehumidification has taken place. If desired, reference may be had to the Shoemaker disclosure for a more detailed description of the air circulation system diagrammatically illustrated herein. However, for the purposes of the present invention, the above-described portions of the apparatus may take other known forms.

In particular accordance with the present invention the dehumidifying passage structure (designated generally by the reference character 15) is of such a nature that it presents heat exchange capacity ample for the condensation of undesired box humidity and will remain, during air circulation periods, at substantially 32° F.

Figure 2:
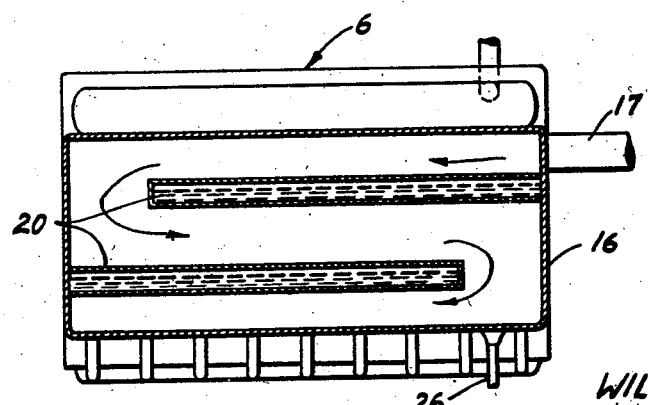
Figure 2 is a sectional view, on an enlarged scale, taken along the line 2—2 of Figure 1.

With particular reference to Figures 1 and 2, it will be seen that the dehumidifying zone or passage is enclosed within a housing 16, having air inflow and outflow ports 17 and 18, said housing being adapted for securement in heat exchange relation with a side wall of the evaporator 6, in any convenient manner. A block or pad of insulating material 19 is interposed between the housing 16 and the side wall of evaporator 6, said block being of any desired known material of low thermal conductivity. While the necessary heat exchange between the area within the housing 16 and the evaporator 6 is provided in a manner fully set forth hereinafter, it will be appreciated that the thermal impedance presented by the insulating material 19 will insure a rapid temperature rise within the housing, when warm moist air is introduced through the inflow port 17.

Figure 3:
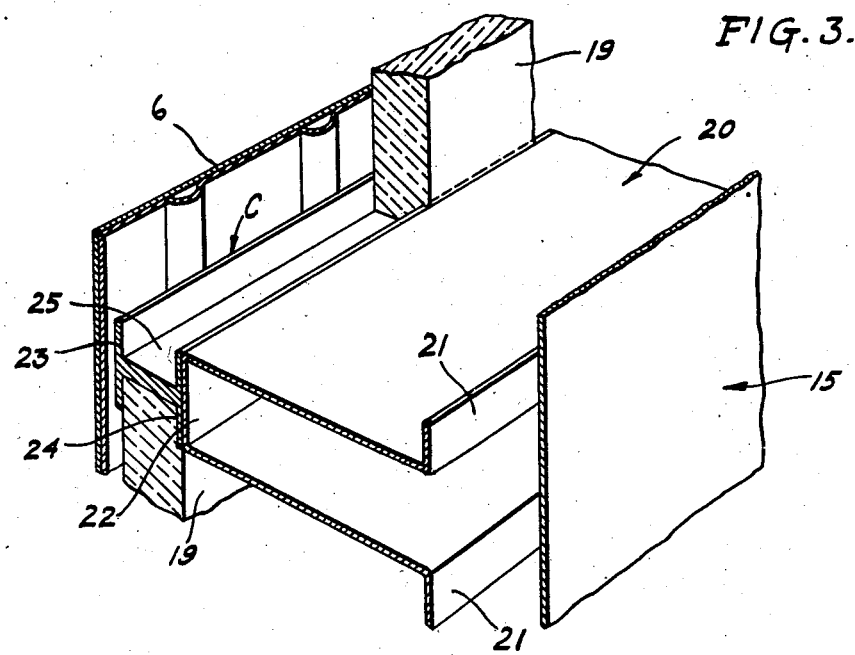
Figure 3 is a fragmentary sectional view in perspective, illustrating certain constructional features of the moisture-condensing passage shown in Figures 1 and 2.

As best appears in Figures 2 and 3, the air passing through the housing 16 is caused to take a circuitous path through said housing, flowing around baffle members shown at 20. These baffle members are generally C-shaped in cross section and extend the full width of the housing, thereby insuring the desired circuitous movement of the moist air.

Each baffle is provided with outwardly turned flange portions 21—21, which are welded or otherwise secured to the inner face of the side wall of housing 16. As will be apparent from the drawings, each baffle cooperates with the housing side wall in such manner as to provide an enclosed fluid-tight space within the baffle, which space, as will now be set forth, is of particular importance in the present invention.

The space enclosed by each baffle member is filled with a freezable liquid, preferably water, sufficient space being left free of the liquid to accommodate expansion of the liquid without creating pressure within the baffle.

The web portion 22 of each baffle, is arranged in spaced confronting relation with the side wall of evaporator 6, the insulating material 19 being interposed as above described. As illustrated in Figure 3, a channel C of generallay H-shaped cross-sectional configuration is arranged to provide the desired heat exchange between the baffles 20 and the evaporator 6, side portions 23 and 24 of said channel being in high heat exchange relation with the evaporator 6 and the baffle web portion 22, respectively. As is evident from a consideration of Figure 3, the channel web section 25 provides the necessary heat-conducting path through the insulating material 19. Preferably, the baffle members 20 and the channels C are of high heat conducting material, for example aluminum, but are of a gauge sufficiently light to present a relatively low thermal mass.

The operation of the above described apparatus is as follows, it being understood that operation of the lower temperature evaporator 6, by virtue of the conducting path afforded by channel C, has, prior to the initiation of the air-flow cycle, lowered the temperature of the baffles 20 and the liquid contained therein. Over a period of time, the liquid becomes frozen, and this frozen condition obtains at the initiation of a humidity-reducing cycle.

Existence of an undesirably high humidity condition within the compartment 4 initiates operation of the blower 11, by means of the humidostat 12, thereby causing air to be withdrawn through duct 13, passed through the blower unit, and thence directed into the dehumidifying unit 16 through the port 17.

A transfer of latent heat occurs between the warm moist air injected into the housing 16 and the surfaces exposed within said housing, which surfaces may, for example, be at a temperature in the neighborhood of 15 to 18° F., at the initiation of a humidity-reducing cycle. Since only specific heat need be supplied to raise the temperature of the baffle structure and of the congealed liquid, when the liquid is at temperatures below the freezing point thereof, the temperature within the housing 16 rises very quickly to the melting point of the congealed liquid. When this temperature rise has occurred, a further temperature increase is impossible until the liquid has become melted, since the heat abstracted from the inflowing air is utilized in effecting a change of state of the congealed liquid within the baffles. In view of the fact that only 0.505 B. t. u. is required to raise the temperature of one pound of ice 1° F. (at temperatures below 32° F.) it is evident that the rise to the melting point of ice will take place very rapidly and that when this melting point is reached, the housing structure, which is somewhat above the temperature of the baffles, will attain a temperature such that any small quantities of ice which have accumulated upon the baffles, and at other points within the housing 16, will be reconverted to the liquid state and flow off from the housing through the drain passage 26. At the melting point, ice has a latent heat of fusion 144 B. t. u. per pound and, as a consequence, the baffle structures provide a very substantial thermal mass when the fusion point has been reached. This thermal mass is sufficient to insure adequate condensation of moisture present in the circulating air, without the possibility of the baffle structures passing above the dew-point temperature of the warm moist air, it being understood that the box air is preferably introduced into the dehumidifying zone at about 38 to 40° F., and at a relative humidity value of from 85% to 90%. The quantity of water contained within the baffles 20 is, of course, determined by the design and capacity of the particular embodiment under consideration. Also, it should be borne in mind that liquids other than water may be utilized as desired, the important factors being that the liquid chosen have the required high latent heat of fusion and that the fusion temperature be in a range which will result in the required non-frosting, condensing temperature within the housing structure.

The foregoing dehumidifying operation takes place periodically as required, the air being passed through the duct 13, condensing zone 15, and reinjected through duct 14, in accordance with the determinations of the humidostat, or other air-flow initiating device employed.

Figure 4:
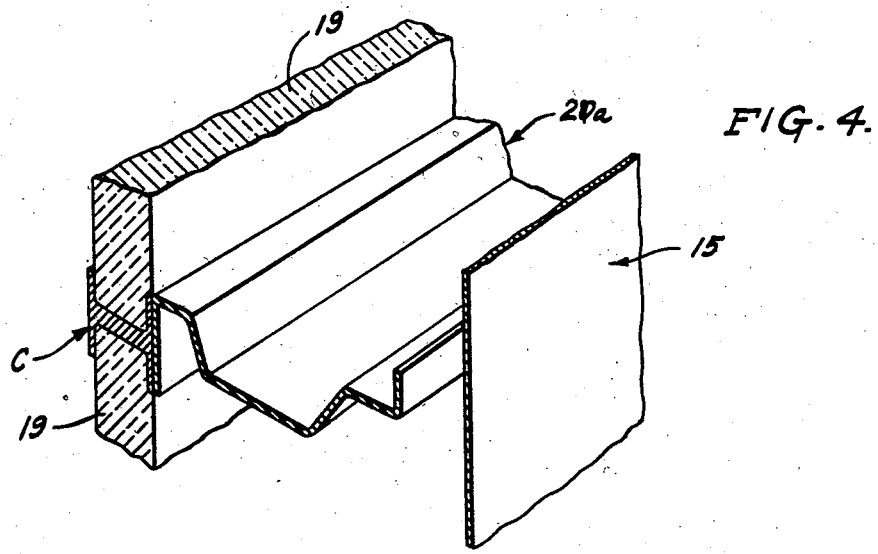
Figure 4 is a view similar to Figure 3, and illustrating a modification of the present invention.

In the modified form illustrated in Figure 4, trough-like baffle members, one of which is shown at 20a, are substituted for the enclosed baffle structures 20. In such an embodiment, the moisture condensed from the air collects in the trough portion of members 20a and, upon cessation of humidity-reducing cycle, is frozen by the evaporator 6, after which its latent heat of fusion is available during the next succeeding dehumidifying operation, as and for the purpose set forth above in connection with the first embodiment. Operation of this modified embodiment will be evident without further detailed explanation.

From the foregoing it will be apparent that the present invention provides improved humidity control apparatus, which will automatically attain and hold a temperature adequate for the condensation of undesired moisture, and without any possibility of substantial frost accumulation in the dehumidifying zone.

I claim:

1. In refrigeration apparatus including a plurality of refrigerated zones one of which comprises a compartment adapted to be maintained at a condition of high relative humidity, cooling means effective to maintain said compartment at a non-frosting temperature, cooling means adapted to operate at a temperature below that prevailing in said compartment and effective to cool another of said zones to a temperature below the freezing point of water, a freezable liquid in heat exchange relation with said last-mentioned cooling means, said liquid having a fusion temperature in the region of 32° F. and a relatively high latent heat of fusion, said liquid normally being maintained in a frozen condition by the action of the cooling means and presenting a substantial and stable thermal mass when raised to the fusion temperature, and means for effecting circulation of air from said compartment in heat exchange relation with said frozen liquid, whereby to condense moisture from the air at a stable temperature in the region of the freezing point of water and without effecting substantial increase in the temperature of said last-mentioned cooling means.

2. In refrigeration apparatus including a plurality of refrigerated zones one of which comprises a compartment adapted to be maintained at a condition of high relative humidity, cooling means effective to maintain said compartment at a non-frosting temperature, cooling means adapted to operate at a temperature below that prevailing in said compartment and effective to cool another of said zones to a temperature below the freezing point of water, a freezable liquid in heat exchange relation with said last-mentioned cooling means, said liquid having a fusion temperature in the region of 32° F. and a relatively high latent heat of fusion, said liquid normally being maintained in a frozen condition by the action of the cooling means and presenting a substantial and stable thermal mass when raised to the fusion temperature, means for effecting circulation of air from said compartment in heat exchange relation with said frozen liquid, whereby to condense moisture from the air at a stable temperature in the region of the freezing point of water and without effecting substantial increase in the temperature of said last-mentioned cooling means, and means for controlling the operation of said air circulating means, said last means being effective to initiate operation of said air circulating means upon the relative humidity in said compartment exceeding a predetermined value.

3. In refrigeration apparatus including a compartment maintained at a condition of high relative humidity, an evaporator adapted to operate at a temperature below the freezing point of water and defining a sharp freezing compartment, a freezable liquid in heat exchange relation with said evaporator, said liquid having a fusion temperature in the region of 32° F. and a relatively high latent heat of fusion, said liquid normally being maintained in a frozen condition by the action of said evaporator and presenting a substantial and stable thermal mass when raised to the fusion temperature, and means for effecting circulation of air from said compartment in heat exchange relation with said frozen liquid, whereby to condense moisture from the air at a stable temperature in the region of the freezing point of water and without effecting substantial increase in the temperature of said evaporator.

4. In refrigeration apparatus including a compartment maintained at a condition of high relative humidity, an evaporator adapted to operate at a temperature below that prevailing in said compartment, a freezable liquid in heat exchange relation with said evaporator, said liquid having a fusion temperature in the region of 32° F. and a relatively high latent heat of fusion, said liquid normally being maintained in a frozen condition by the action of the said evaporator and presenting a substantial and stable thermal mass when raised to the fusion temperature, and means for effecting circulation of air from said compartment in heat exchange relation with said frozen liquid, whereby to condense moisture from the air at a stable temperature in the region of the freezing point of water and without effecting substantial increase in the temperature of said evaporator.

5. In refrigeration apparatus including a compartment maintained at a condition of high relative humidity, an evaporator adapted to operate at a temperature below that prevailing in said compartment, a freezable liquid in heat exchange relation with said evaporator, said liquid having a fusion temperature in the region of 32° F. and a relatively high latent heat of fusion, said liquid normally being maintained in a frozen condition by the action of the said evaporator and presenting a substantial and stable thermal mass when raised to the fusion temperature, means for effecting circulation of air from said compartment in heat exchange relation with said frozen liquid, whereby to condense moisture from the air at a stable temperature in the region of the freezing point of water and without effecting substantial increase in the temperature of said evaporator, and means for controlling the operation of said air circulating means, said last means being effective to initiate operation of said air circulating means upon the relative humidity in said compartment exceeding a predetermined value.

6. In refrigeration apparatus including a plurality of refrigerated zones one of which comprises a compartment adapted to be maintained at a condition of high relative humidity, first cooling means effective to maintain said compartment at a non-frosting temperature, second cooling means comprising an evaporator effective to cool another of said zones to a sub-freezing temperature, a body of liquid in heat exchange relation with said evaporator and normally maintained in a frozen condition by the action of said evaporator, said body presenting a substantial and stable thermal mass when raised to the fusion temperature, and means for effecting circulation of air from said compartment in heat exchange relation with said frozen body whereby to condense moisture from the air under a stable condition in the region of the freezing point of water and without effecting substantial increase in the temperature of said evaporator.

7. In refrigeration apparatus including a plurality of refrigerated zones one of which comprises a compartment adapted to be maintained at a condition of high relative humidity, first cooling means effective to maintain said compartment at a non-frosting temperature, second cooling means comprising an evaporator effective to cool another of said zones to a sub-freezing temperature, a body of liquid in heat exchange relation with said evaporator and normally maintained in a frozen condition by the action of said evaporator, said body presenting a substantial and stable thermal mass when raised to the fusion temperature, means for effecting circulation of air from said compartment in heat exchange relation with said frozen body whereby to condense moisture from the air under a stable condition in the region of the freezing point of water and without effecting substantial increase in the temperature of said evaporator, and humidity-responsive means for controlling the operation of said air circulating means, said humidity-responsive means being effective to initiate operation of said air circulating means upon the relative humidity in said compartment exceeding a predetermined value and to maintain such circulation until said predetermined value has been re-established.

8. In refrigeration apparatus including a plurality of refrigerated zones one of which comprises a compartment maintained at a condition of high relative humidity, an evaporator adapted to operate at a temperature below that prevailing in said compartment and effective to cool another of said zones to a sub-freezing temperature, an air flow passage arranged in heat exchange relation with said evaporator, a freezable liquid in high heat exchange relation with said passage, said liquid having a fusion temperature in the region of 32° F. and a relatively high latent heat of fusion, said liquid further being normally maintained in a frozen condition by the action of the said evaporator and presenting a substantial and stable thermal mass when raised to the fusion temperature, and means for effecting circulation of air from said compartment through said passage, whereby to condense moisture from the air at a stable temperature in the region of the freezing point of water and without effecting substantial increase in the temperature of said evaporator.

9. In refrigeration apparatus including a compartment maintained at a condition of high relative humidity, an evaporator adapted to operate at a temperature below that prevailing in said compartment, an air flow passage arranged in heat exchange relation with said evaporator, a freezable liquid within said passage, said liquid having a relatively high latent heat of fusion and normally being maintained in a frozen condition by the action of said evaporator and presenting a substantial and stable thermal mass when raised to the fusion temperature, and means for effecting circulation of air from said compartment through said passage, whereby to condense moisture from the air at a stable temperature in the region of the freezing point of water and without effecting substantial increase in the temperature of said evaporator.

WILLIAM RUDOY.

REFERENCES CITED

The following references are of record in the file of this patent:

UNITED STATES PATENTS

| Number | Name | Date |
| --- | --- | --- |
| 229,750 | Portner | July 6, 1880 |
| 2,013,848 | Heideman | Sept. 10, 1935 |
| 2,063,646 | Whitesel | Dec. 8, 1936 |
| 2,188,526 | Burden | Jan. 30, 1940 |
| 2,252,979 | Reiter | Aug. 19, 1941 |